US008615140B2

United States Patent
Tin

(10) Patent No.: US 8,615,140 B2
(45) Date of Patent: Dec. 24, 2013

(54) COMPRESSION OF IMAGE DATA IN ACCORDANCE WITH DEPTH INFORMATION OF PIXELS

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 131 days.

(21) Appl. No.: 13/300,447

(22) Filed: Nov. 18, 2011

(65) Prior Publication Data

US 2013/0129245 A1    May 23, 2013

(51) Int. Cl.
    *G06K 9/46* (2006.01)
(52) U.S. Cl.
    USPC ......................................................... 382/248
(58) Field of Classification Search
    None
    See application file for complete search history.

(56) References Cited

U.S. PATENT DOCUMENTS

| | | | |
|---|---|---|---|
| 6,055,330 A | 4/2000 | Eleftheriadis et al. | |
| 7,106,366 B2 | 9/2006 | Parker et al. | |
| 7,203,356 B2 | 4/2007 | Gokturk et al. | |
| 7,412,110 B1* | 8/2008 | Worthington | 382/279 |
| 2002/0122489 A1* | 9/2002 | Kuniba | 375/240.21 |
| 2009/0245685 A1* | 10/2009 | Makii | 382/276 |
| 2010/0085351 A1* | 4/2010 | Deb et al. | 345/419 |
| 2010/0103311 A1* | 4/2010 | Makii | 348/369 |

FOREIGN PATENT DOCUMENTS

WO    2010/151279 A1    12/2010

OTHER PUBLICATIONS

J.J.D. van Schalkwyk, et al., "Low Bitrate Video Coding with Depth Compensation", IEEE Proc.-Vis. Image Signal Process., vol. 141, No. 3 (Jun. 1994).
S. Kavitha, et al., "Lossy compression through segmentation on low depth-of-field images", Digital Signal Processing 19, pp. 59-65 (2009).
"Digital Cinema System Specification", Digital Cinema Initiatives, LLC, Version 1.2 (Mar. 2008).
"Racking focus", Wikipedia.org, last modified on Jul. 22, 2011, available at http://en.wikipedia.org/wiki/Racking_focus.
"Bokeh", Wikipedia.org, last modified on Nov. 15, 2011, available at http://en.wikipedia.org/wiki/Bokeh.
"Depth of field", Wikipedia.org, last modified on Nov. 15, 2011, available at http://en.wikipedia.org/wiki/Depth_of_field.
"JPEG 2000", Wikipedia.org, last modified on Oct. 24, 2011, available at http://en.wikipedia.org/wiki/JPEG_2000.

* cited by examiner

*Primary Examiner* — Barry Drennan
*Assistant Examiner* — Feng Niu
(74) *Attorney, Agent, or Firm* — Fitzpatrick, Cella, Harper & Scinto

(57) ABSTRACT

Compression of image data is provided. Image data is accessed, along with depth information for pixels of an image. A distance from a region of focus for pixels of the image is determined, by calculations that use the depth information. A bit rate for compression of the image data is controlled in accordance with the distance from the region of focus, such that more bits are used for pixels closer to the region of focus and fewer bits are used for pixels farther from the region of focus.

17 Claims, 17 Drawing Sheets

COMPRESSION OF IMAGE DATA IN ACCORDANCE WITH DEPTH INFORMATION OF PIXELS

FIELD

The present disclosure relates to compression of image data.

BACKGROUND

In image processing, it is common to compress image data so as to transmit the image data in a more efficient form. Compression may be mathematically lossy, in which some of the image data is discarded permanently. Compression may also be mathematically lossless, in which compression solely depends on the information content, or entropy, of the data, and perfect reconstruction of the original data from the compressed data can be achieved.

Most compression processes include the concept of a bit rate, and with respect to an image to be compressed, these processes permit the setting of a target bit rate. For example, if the target bit rate is set at a relatively low number of bits per pixel, then the image data may be compressed more aggressively, yielding a relatively small file that may be mathematically lossy. Conversely, if the target bit rate is set at a relatively high number of bits per pixel, then the image data may be compressed less aggressively, yielding a relatively large file that may be mathematically lossless. In view of these compromises, ongoing efforts have been directed at rate-distortion optimization, i.e., optimizing the amount of distortion (loss of image quality) against the amount of data required to encode the image (the bit rate).

SUMMARY

Typical compression processes use only the image data in rate-distortion optimization and are not capable of utilizing additional information of the image even if it is available. Such information, if utilized, may further improve rate-distortion optimization. For example, different areas of the image may have different importance or saliency. For a given target bit rate, better visual quality of the compressed image may be achieved by compressing the more important areas less aggressively and compressing the less important areas more aggressively. Such areas in the image may, for example, be identified based on the amount of defocus blur. In turn, the amount of defocus blur may be determined if depth information and camera settings are available.

The disclosure addresses the foregoing by controlling the bit rate of a compression process based on a depth map which allows determination of the distance of each pixel in the image from a region of focus. The region of focus may be a depth of field, which can be determined from camera settings such as the focal length, F-number and focusing distance.

Thus, in an example embodiment described herein, image data is accessed, along with depth information for pixels of the image. A distance from a region of focus for pixels of the image is determined, by calculations that use the depth information. A bit rate for compression of the image data is controlled in accordance with the distance from the region of focus, such that more bits are used for pixels closer to the region of focus and fewer bits are used for pixels farther from the region of focus.

By controlling the bit rate of a compression process based on a depth map which allows determination of the distance of each pixel in the image from a region of focus, it is ordinarily possible to compress different areas of the image according to a more optimal bit allocation, thereby improving the visual quality of the compressed image for a given target bit rate.

This brief summary has been provided so that the nature of this disclosure may be understood quickly. A more complete understanding can be obtained by reference to the following detailed description and to the attached drawings.

DETAILED DESCRIPTION

In the following example embodiments, there is described a digital camera which may be a digital still camera or a digital video camera. It is understood, however, that the following description encompasses arbitrary arrangements which can incorporate or utilize other imaging assemblies, for instance, a data processing apparatus having an image sensing function (e.g., a personal computer) or a portable terminal having an image sensing function (e.g., a mobile telephone).

Figure 1A:
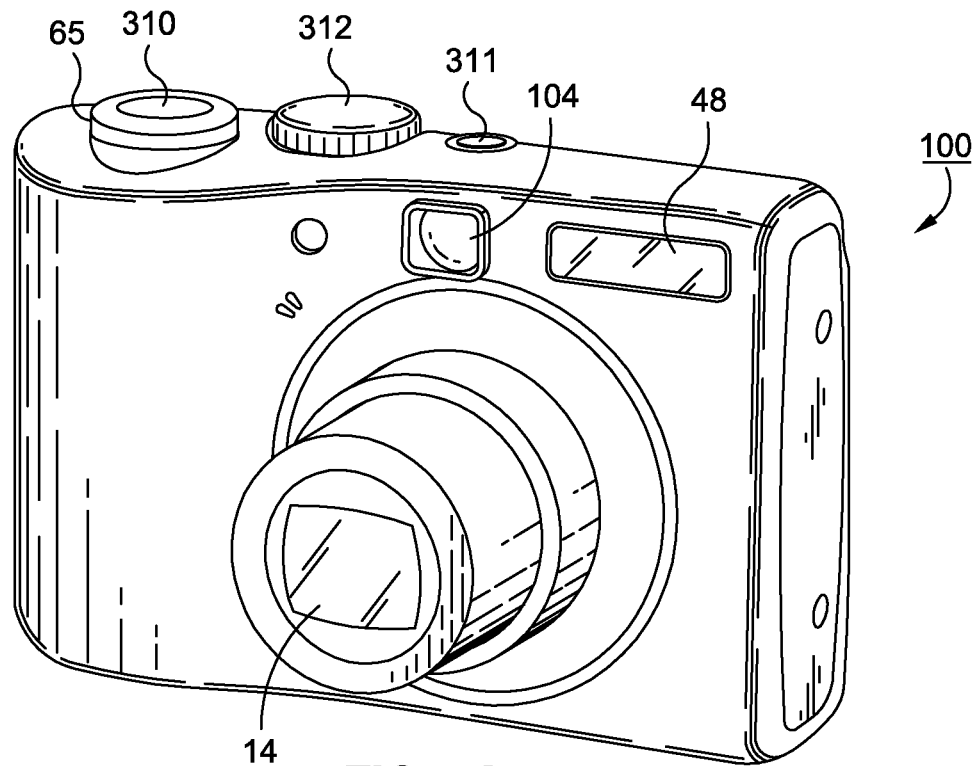
FIGS. 1A and 1B are views depicting an external appearance of an image capture device according to an example embodiment.
Figure 1B:
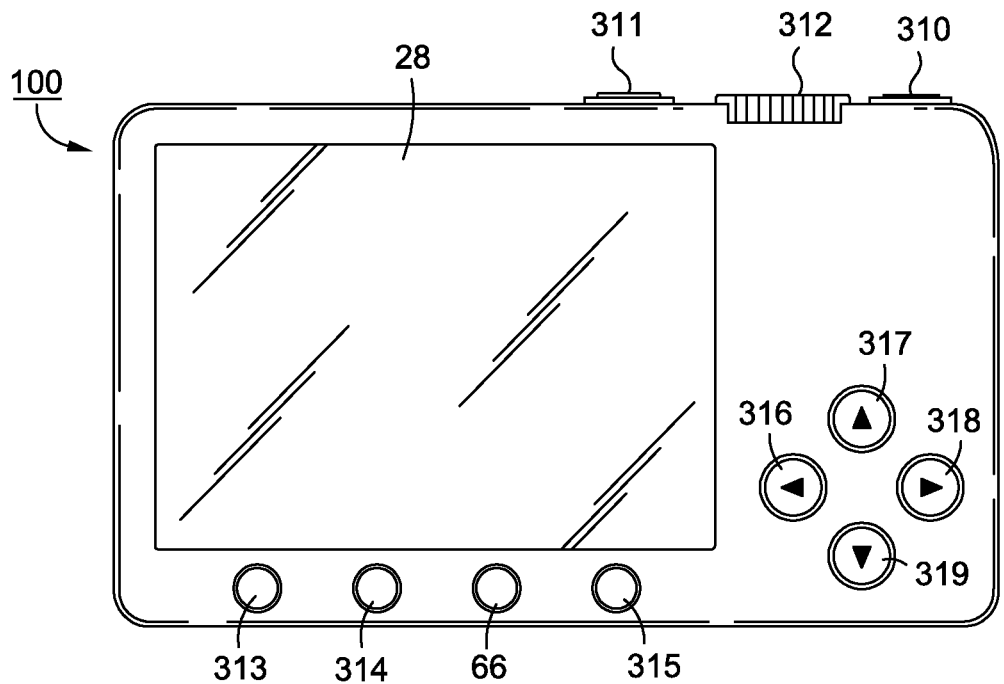

FIGS. 1A and 1B are views showing an example of an external appearance of an image capture device 100 according to an example embodiment. Note that in these figures, some components are omitted for conciseness. A user operates buttons and switches 310 to 319 for turning ON/OFF the power of the digital camera 100, for setting, changing or confirming the shooting parameters, for confirming the status of the camera, and for confirming shot images.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14 that is inside camera 100 is an image sensor which converts an optical image into an electrical signal. Image sensor 14 will be described more fully below with respect to FIG. 2A.

The power button 311 is provided to start or stop the digital camera 100, or to turn ON/OFF the main power of the digital camera 100. The menu button 313 is provided to display the setting menu such as shooting parameters and operation modes of the digital camera 100, and to display the status of the digital camera 100. The menu includes selectable items or items whose values are variable.

A delete button 315 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 314 is pressed for selecting a mode or an item. When the enter button 314 is pressed, the system controller 50 in FIG. 2A sets the mode or item selected at this time. The display ON/OFF button 66 is used for selecting displaying or non-displaying of photograph information regarding the shot image, and for switching the image display unit 28 to be functioned as an electronic view finder.

A left button 316, a right button 318, an up button 317, and a down button 319 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

Figure 2A:
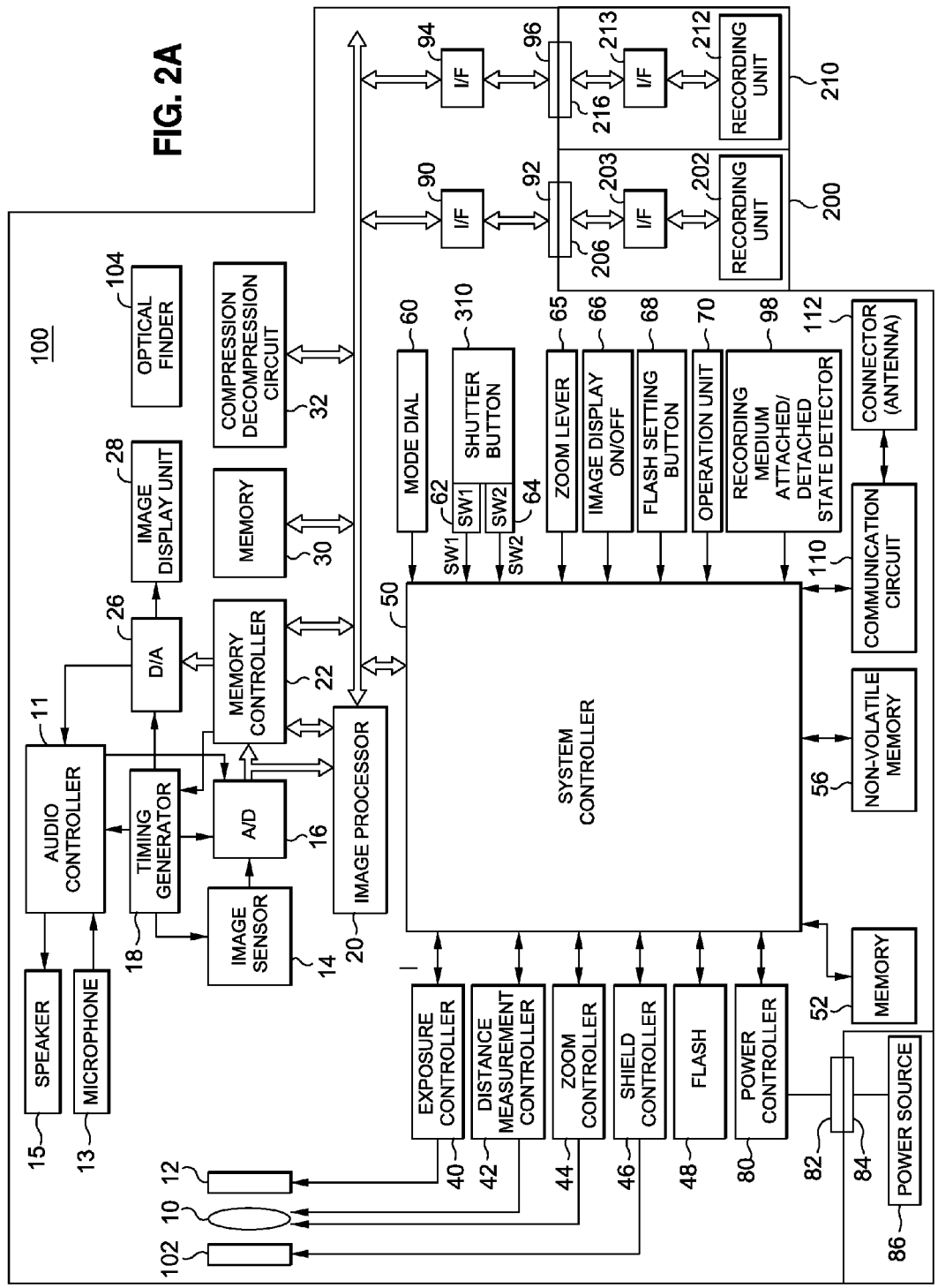
FIGS. 2A and 2B are detailed block diagrams for explaining the internal architecture of the image capture device shown in FIG. 1 according to an example embodiment.

FIG. 2A is a block diagram showing an example of the arrangement of the digital camera 100 as an image capture device according to this embodiment. Referring to FIG. 2, reference numeral 10 denotes an imaging lens; 12, a shutter having an aperture function; and 14, an image sensor which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

In FIG. 2, an imaging assembly is comprised of image sensor 14 and associated optics, such that in some embodiments the imaging assembly is comprised of image sensor 14 and lens 10.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (Electronic Flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by wavelet compression or the like. The compression/decompression unit 32 loads captured image data stored in the memory 30 in response to pressing of the shutter 310 as a trigger, executes the compression processing, and writes the processed data in the memory 30.

Figure 6:
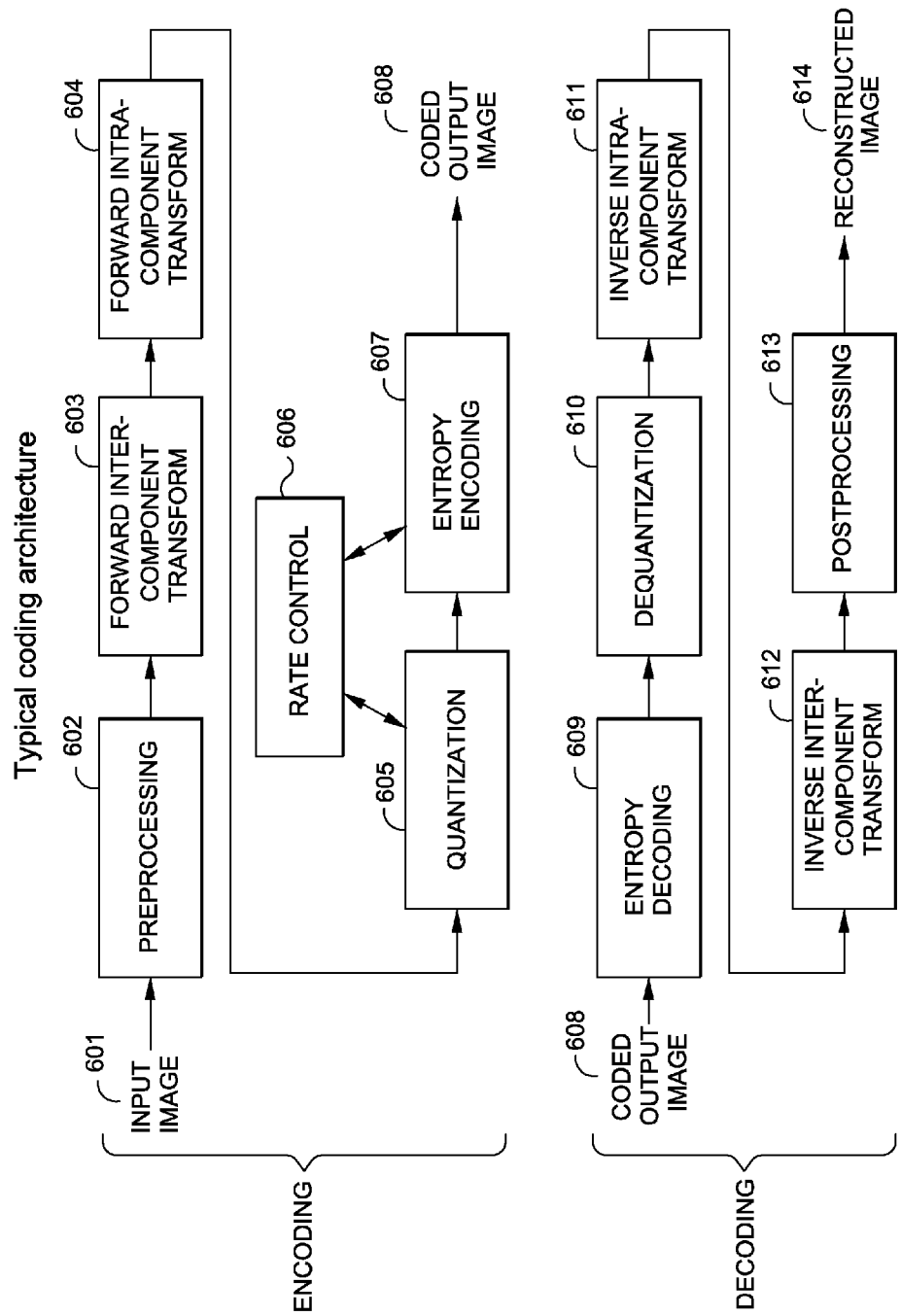
FIG. 6 is a block diagram for explaining a coding architecture according to an example embodiment.

According to the present disclosure, compression/decompression unit 32 compresses image data in accordance with bit rate control. In that regard, a typical compression/decompression (codec) process such as JPEG 2000 may follow a structure of encoding and decoding as depicted in FIG. 6. However, according to the present disclosure, depth information for each pixel is used to control the bit rate during compression by compression/decompression unit 32, such that more bits are used for pixels closer to the region of focus and fewer bits are used for pixels farther from the region of focus, as described more fully below.

In addition, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in nonvolatile memory 56 and/or the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26. It is understood that in other embodiments, the image display unit 28 may take digital image data directly and may not require a prior D/A conversion.

The exposure controller 40 controls the shutter 12 having a diaphragm function based on the data supplied from the system controller 50. The exposure controller 40 may also have a flash exposure compensation function by linking up with flash (flash emission device) 48. The flash 48 has an AF auxiliary light projection function and a flash exposure compensation function. In other embodiments, the flash 48 may provide additional types of active illumination, such as infrared illumination, to allow 3D shape or depth sensing through the use of structured illumination.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
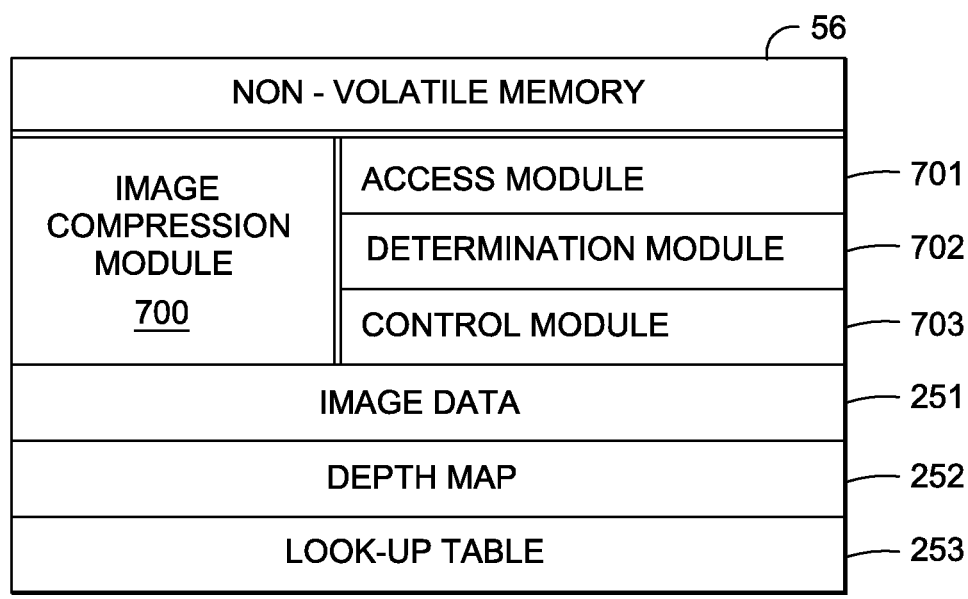

In particular, as shown in FIG. 2B, non-volatile memory 56 is an example of a non-transitory computer-readable memory medium, having retrievably stored thereon image compression module 700 as described herein. According to this example embodiment, the image compression module 700 includes at least an access module 701 for accessing image data and depth information for pixels of an image, a determination module 702 for determining a distance from a region of focus for pixels of the image by calculations that use the depth information, and a control module 703 for controlling a bit rate for compression of the image data in accordance with the distance from the region of focus, such that more bits are used for pixels closer to the region of focus and fewer bits are used for pixels farther from the region of focus.

Additionally, as shown in FIG. 2B, non-volatile memory 56 also includes image data 251, which includes captured or otherwise acquired image data. Non-volatile memory 56 further stores depth map 252. Depth map 252 stores depth information indicating the distances of pixels in the color image from a reference point of view. Look-up table 253 determines a bit allocation between pixels closer to the region of focus and pixels farther from the region of focus. Each of these elements will be described more fully below.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (Electronic Flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in non-volatile memory 56, and/or in recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in non-volatile memory 56, and/or in recording medium 200 or 210.

The digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as a NiCd battery, a NiMH battery or a Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, and SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of image display unit 28, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3:
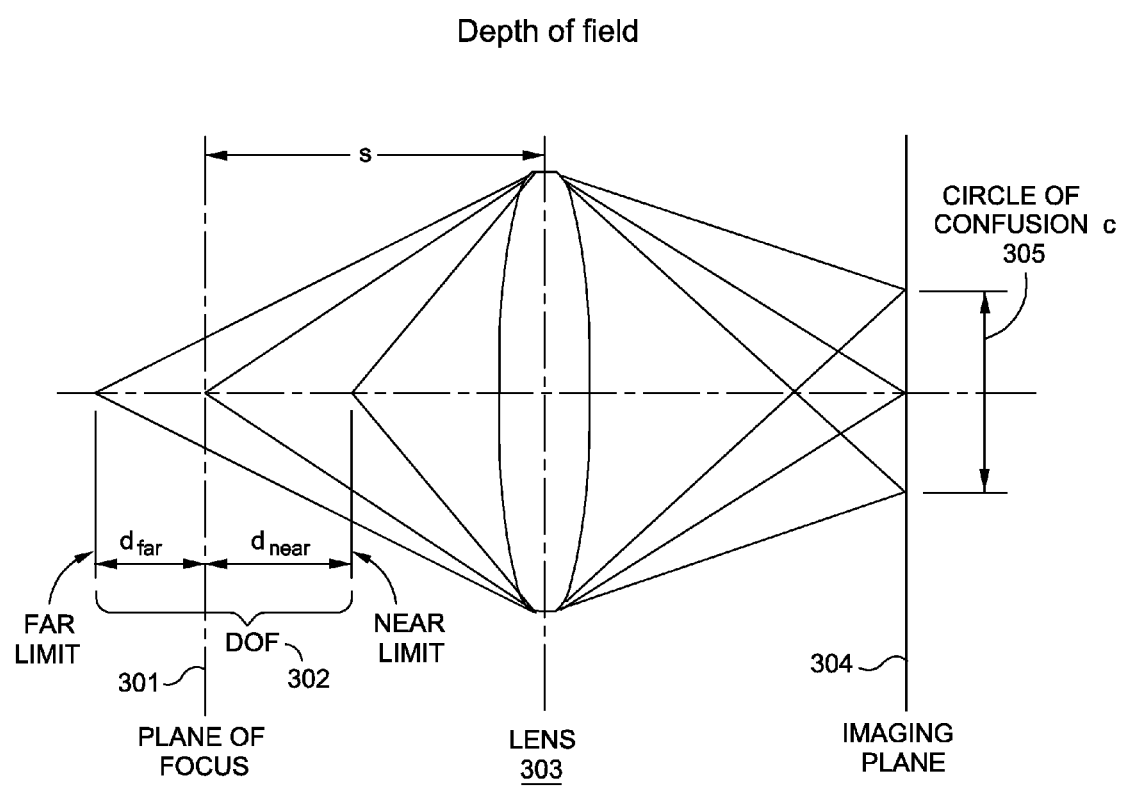
FIG. 3 is a view for explaining concepts related to depth of field.

FIG. 3 is a view for explaining concepts related to depth of field.

Generally, a depth of field (DOF) is a region between the nearest and farthest distance in a scene at which objects appear acceptably sharp in an image. Typically, the depth of field can be determined by capture parameters of the camera system used in the capture and the focus distance.

In that regard, FIG. 3 depicts a camera system with an ideal thin lens 303 with focal length f, aperture f-number N, imaging plane 304 and focus distance s. A region of focus, such as a depth of field, can be determined from these capture parameters. The capture parameters (focal length f, aperture f-number N, focus distance s, or similar capture parameters) can be stored as metadata along with the image data during image capture.

According to the present disclosure, depth information for pixels of the image, such as in depth map 252, is used to determine a distance from a region of focus for pixels of the image by calculations that use the depth information. In particular, the distance of a pixel from a reference point of view is compared with, for example, the distance of a region of focus from the same reference point of view.

Refer now to FIG. 3. Strictly speaking, an object is in optical focus only if it is located at the plane of focus, which is at distance s from the lens. However, due to the limited resolving power of the human visual system, a region called depth of field, which contains the plane of focus, appears to be in focus to the human eyes so that objects within the depth of field appear acceptably sharp. More specifically, a point object not in optical focus is captured on the imaging plane (image sensor) as a blur circle with finite diameter. The largest blur circle that human eyes perceive as acceptably sharp is referred to as the circle of confusion c. The circle of confusion varies with application and depends on many factors such as human visual acuity, sensor format, screen size and viewing distance. For photography applications, the circle of confusion is commonly taken to be 0.029 mm for a full frame 35 mm sensor. For cinematography applications, the American Cinematographer Manual recommends a circle of confusion of 0.001 inches (0.0254 mm) for 35 mm film format.

In this example, a depth of field 302 is determined by the near and far limits, whose distances from the plane of focus are given by the equations $$d_{near} = \frac{sNc(s-f)}{f^2 + Nc(s-f)} \text{ and } d_{far} = \frac{sNc(s-f)}{f^2 - Nc(s-f)}$$

for the ideal thin lens shown in FIG. 3, although other equations may be used for more realistic lens systems. Thus, it is possible to determine the depth of field (or plane of focus) from capture parameters such as the focal length f, aperture f-number N and focus distance s which are available from the camera data interface or as metadata stored along with the image data.

A distance of a pixel from a depth of field, or from a plane of focus or other region of focus, is determined by referring to depth information for each pixel. The depth information of the pixel indicates the distance of a pixel from a reference point of view, such as from the camera or a more precise reference point such as the imaging lens 303 of the camera. The distance of the pixel is compared with the distance of the depth of field, or plane of focus or other region of focus from the same reference point of view. More precisely, if the distance of the pixel from the reference point of view is larger than the distance of the far limit of the depth of field from the reference point of view, then the distance of the pixel from the depth of field is the absolute value of difference of these two distances. In other words, in this case, the distance of the pixel from the depth of field is the distance of the pixel from the far limit of the depth of field. On the other hand, if the distance of the pixel from the reference point of view is smaller than the distance of the near limit of the depth of field from the reference point of view, then the distance of the pixel from the depth of field is the absolute value of difference of these two distances. In other words, in this case, the distance of the pixel from the depth of field is the distance of the pixel from the near limit of the depth of field. Finally, if the distance of the pixel from the reference point of view is between the distances of the far limit and near limit of the depth of field from the reference point of view, then the distance of the pixel from the depth of field is taken to be zero.

Thus, the depth information indicates distances of pixels from a reference point of view, wherein a region of focus is calculated using capture parameters such as a focal length, an aperture value and a focus distance, and the distance of a pixel from the region of focus is calculated by comparing the distance of the pixel and the distance of the region of focus from the reference point of view.

In some embodiments, a depth map (e.g., depth map 252) may be constructed to store the depth information for each pixel. The depth map thus represents a measure of distances of pixels in the captured scene from a reference point of view along the direction of the optical axis of the capture system. Methods to capture a depth map use a variety of principles, including triangulation by stereoscopic 3D capture (multi-view stereo), 3D scanning by structured light, photometric stereo, time-of-flight camera or LIDAR system and structure from motion (SfM). According to the present disclosure, a bit rate for compression is controlled in accordance with a distance of a pixel from a region of focus, such as a depth of field or a plane of focus.

Figure 4A:
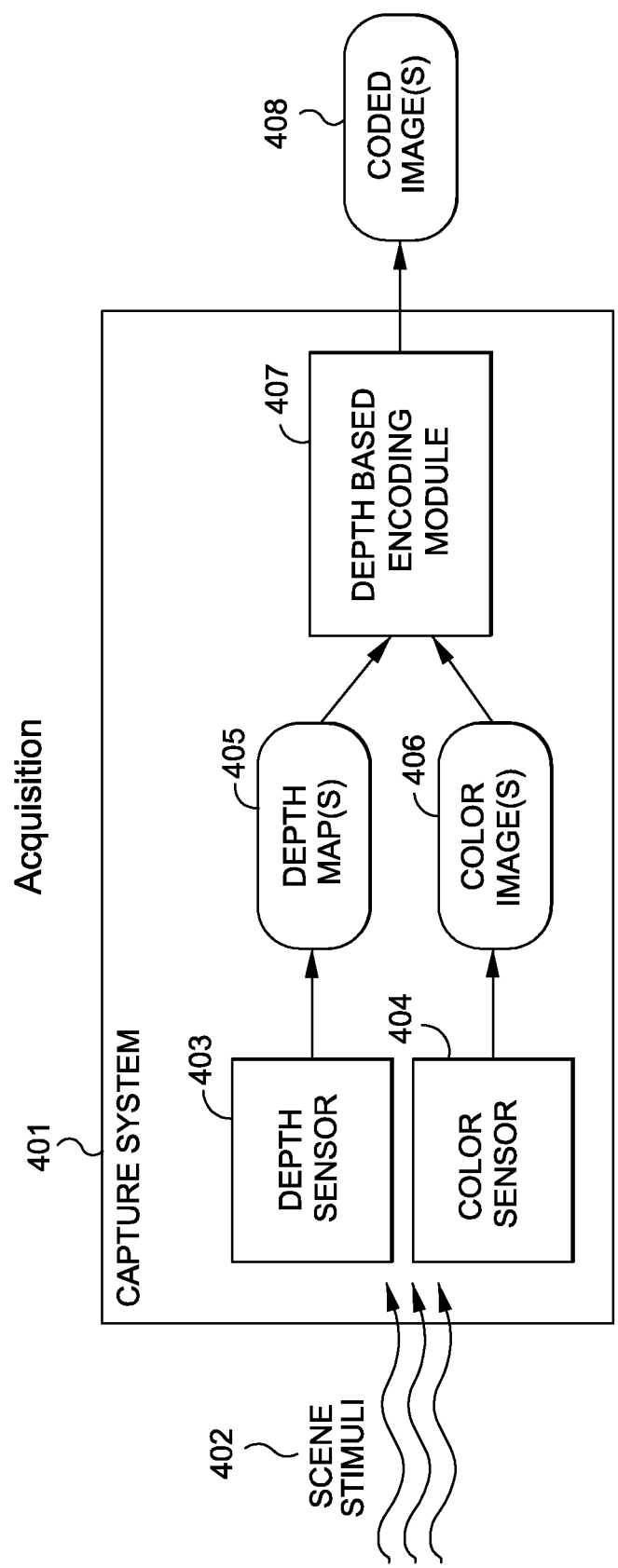
FIG. 4A is a view for explaining depth based encoding in the context of acquisition according to an example embodiment.
Figure 4B:
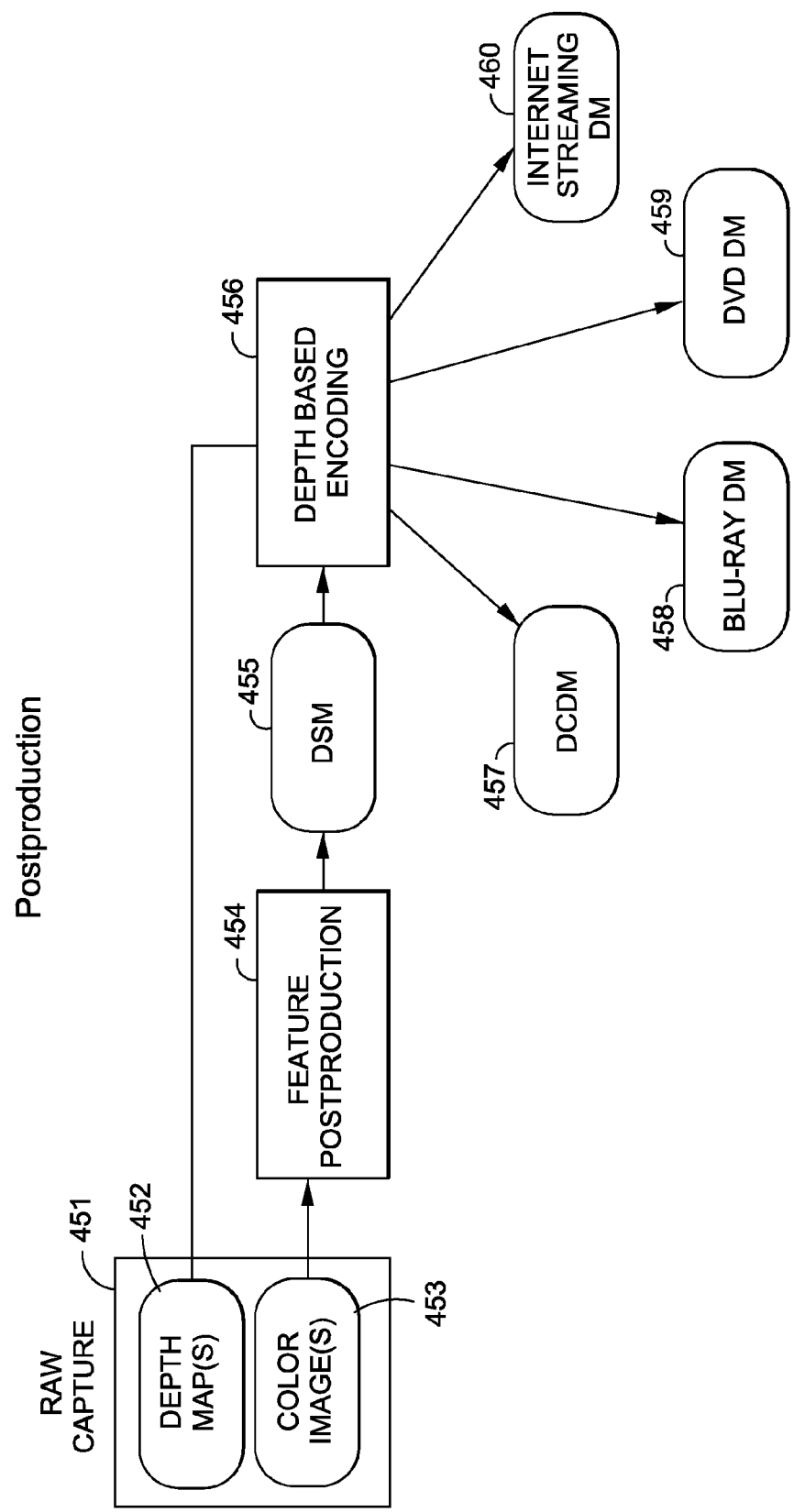
FIG. 4B is a view for explaining depth based encoding in the context of postproduction according to an example embodiment.

In that regard, FIGS. 4A and 4B depict two different application scenarios for applying depth based compression as described herein using compression/decompression unit 32, in accordance with bit rate control. These scenarios are not mutually exclusive. Specifically, FIG. 4A is a view for explaining depth based encoding in the context of acquiring image data and depth information, while FIG. 4B is a view for explaining depth based encoding in the context of postproduction.

In more detail, in FIG. 4A, a capture system 401 contains components capable of measuring depth information and color information. The captured depth information and color information are processed by depth based encoding module 407 to create encoded output that has better coding efficiency and quality due to utilization of the depth information. Scene stimuli 402 are measured by depth sensor 403 and color sensor 404 to obtain depth information and color information, respectively. The depth information from depth sensor 403 is used to generate one or more depth map(s) 405, whereas the color information from color sensor 404 is used to generate one or more color images 406. Depth map(s) 405 and color image(s) 406 are used by depth based encoding module 407 to generate coded image(s) 408 while controlling the bit rate of a compression process based on the depth map(s), as described more fully below.

Meanwhile, FIG. 4B depicts a second scenario in which depth based encoding is performed during postproduction. Raw captured footage 451 consists of a color image 453 and a depth map(s) 452 for each frame. In feature postproduction 454, the color images are processed as usual (e.g., editing, color timing, etc.) to produce a digital source master (DSM) 455. The DSM 455 is then encoded via depth based encoding module 456 to a distribution master, such as digital cinema distribution master (DCDM) 457, Blu-Ray distribution master 458, DVD distribution master 459 or internet streaming distribution master 460. The depth based encoding module 456 performs the encoding based on the depth information such that different distribution masters are created with optimal coding efficiency and quality subject to the data rate constraint of each medium, as explained in the following.

As mentioned above, for a given target average bit rate better visual quality of the compressed image may be achieved by compressing the more important areas less aggressively (higher local bit rate) and compressing the less important areas more aggressively (lower local bit rate). The importance of the areas may, in turn, be determined based on depth information indicating the distance of the corresponding pixel from a region of interest, such as a depth of field.

Figure 5A:
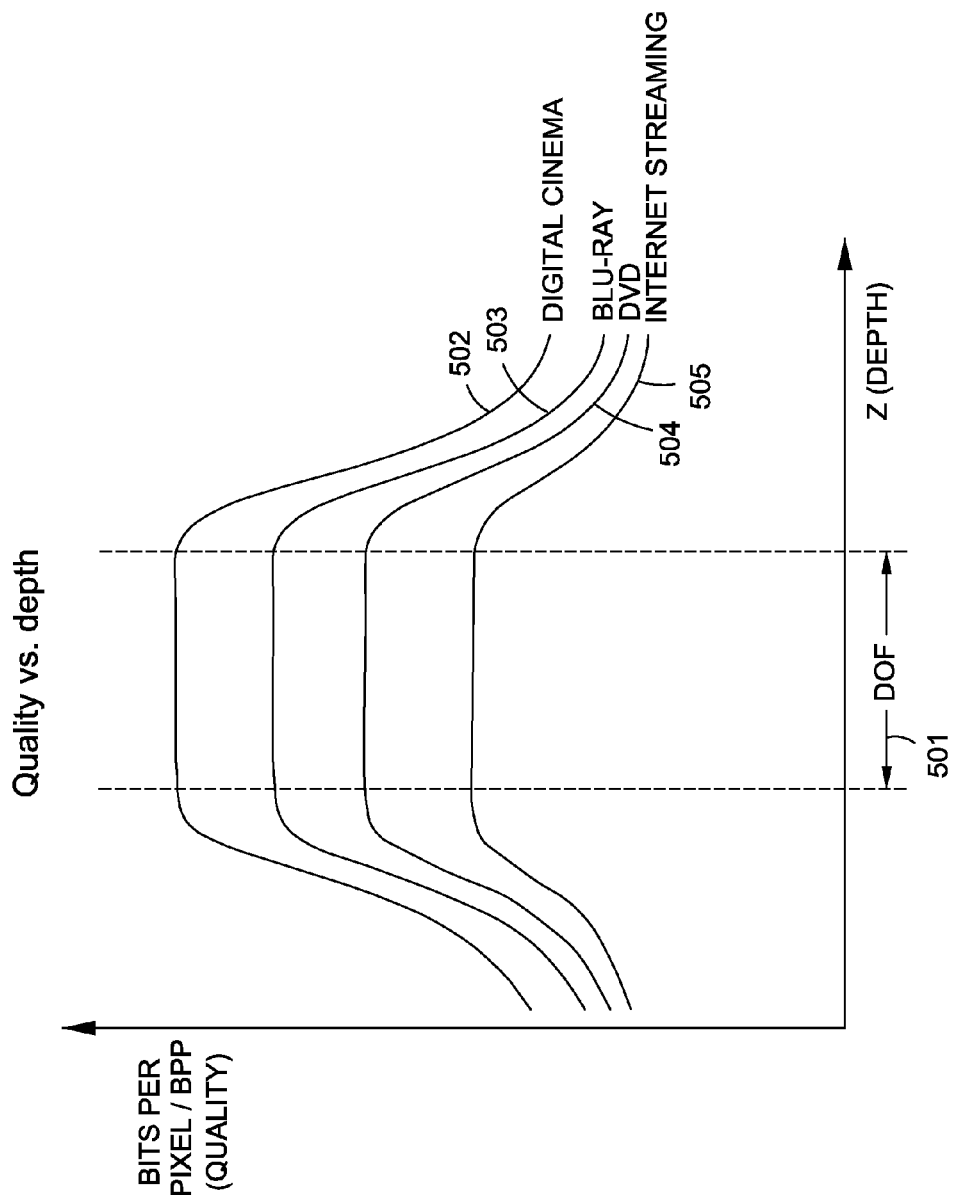
FIGS. 5A and 5B are views for explaining relationships between image quality and depth or blur diameter according to example embodiments.
Figure 5B:
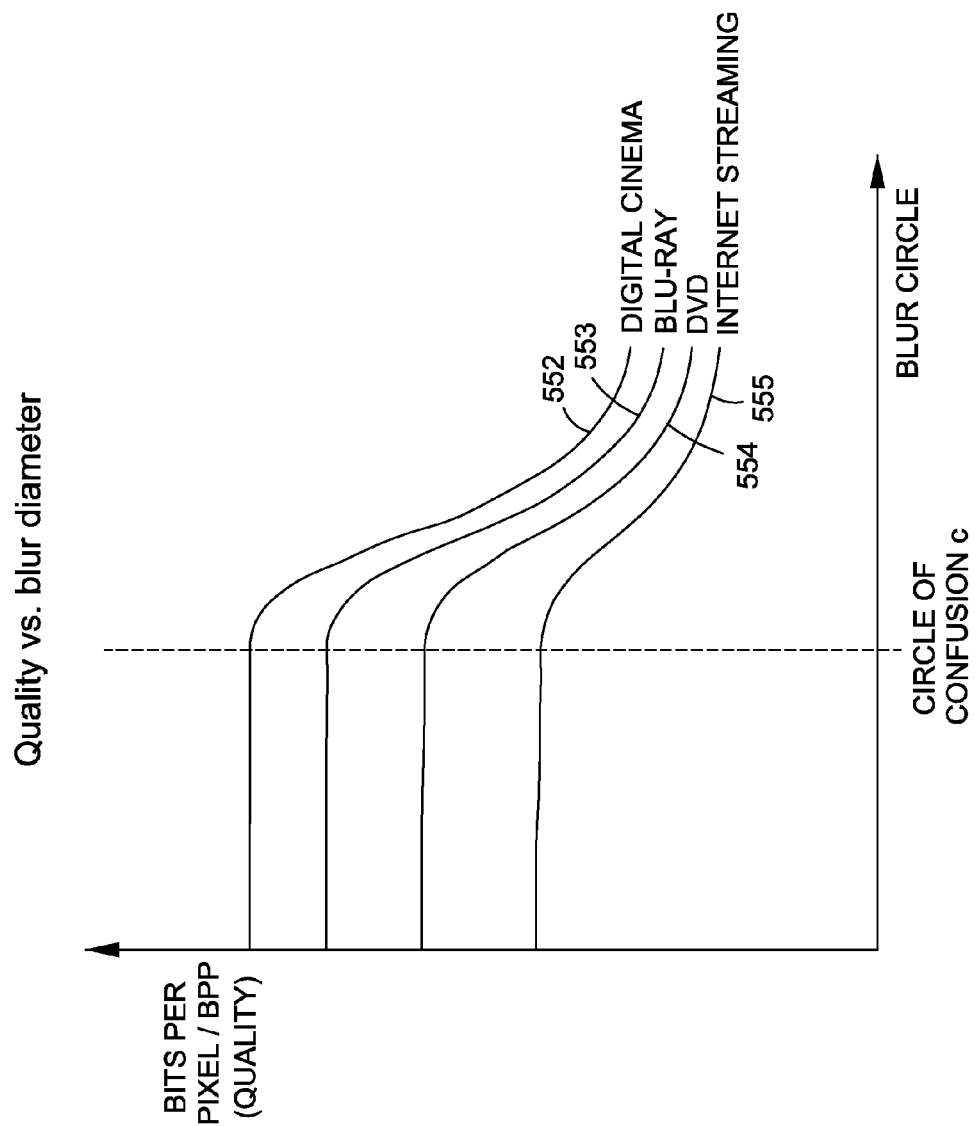

More specifically, FIGS. 5A and 5B are views for explaining a relationship between image quality and depth or blur diameter according to example embodiments. In particular, FIG. 5A illustrates a design goal of depth based compression with depth (z) as the independent variable, whereas FIG. 5B depicts another view of the same goal but using the blur diameter as the independent variable.

Thus, in FIG. 5A, for each of the distribution masters (digital cinema 502, Blu-Ray 503, DVD 504 and internet streaming 505), local bit rate is at a maximum when the pixel is within depth of field 501. Outside depth of field 501, the local bit rate falls off as the pixel is further away from the depth of field. In addition, while this general relationship between local bit rate and depth of the pixel is built into the depth based compression for each distribution master, the maximum local bit rate is different for each distribution master based on the bandwidth of the distribution medium. For example, a distribution master for cinema exhibition can allow a relatively high bit rate, whereas a distribution master for internet streaming can allow only a relatively low bit rate because it needs to cater for users with relatively low internet connection speed.

FIG. 5B shows the corresponding desired relationship between local bit rate and the blur circle diameter for each distribution master (digital cinema 552, Blu-Ray 553, DVD 554 and internet streaming 555). As shown in the figure, when the blur circle is smaller than the circle of confusion, corresponding to the pixel lying within the depth of field, the local bit rate is at a maximum. As the blur circle increases beyond the circle of confusion, the local bit rate decreases. In addition, while this general relationship between local bit rate and the blur circle is built into the depth based compression for each distribution master, the maximum local bit rate is different for each distribution master based on the bandwidth of the distribution medium.

Thus, for a predesignated bit budget such as a predesignated average bit rate dependent on the distribution medium, wherein the average is taken spatially (e.g., within a frame) or temporally (e.g., across multiple frames) or both, a local bit rate can vary spatially or temporally or both based on the depth map in order to achieve the predesignated average bit rate. Example embodiments of depth based encoding implementing such a strategy are described in detail below.

First, a general process of coding and decoding in a compression/decompression process will be described with respect to FIG. 6. Compression includes, for example, transforming the image data from an image domain into coefficients in a transform domain, quantizing the coefficients, and entropy-encoding the quantized coefficients.

FIG. 6 is a block diagram for explaining a coding architecture according to an example embodiment. A typical codec such as JPEG 2000 may follow a structure of encoding and decoding as depicted in FIG. 6. However, according to the present disclosure, rate control 606 uses depth information for each pixel to control the bit rate during compression, such that more bits are used for pixels closer to the region of focus and fewer bits are used for pixels farther from the region of focus.

In FIG. 6, input image 601 is input to preprocessing step 602. Preprocessing step 602 may involve any sort of operations needed to prepare for the encoding, such as shifting the values, e.g., converting integer range 0 . . . 255 (unsigned integers) to −128 . . . 127 (signed integers).

The forward inter-component transform step 603 may involve applying a color space transform to the components (sometimes also called channels), e.g., RGB to YCbCr transform. The forward intra-component transform step 604 may involve applying a sparsifying transform, such as a discrete wavelet transform (DWT), to each component, resulting in a transform domain where compression can be efficiently performed. The output of this step is a set of coefficients in a transform domain.

The quantization step 605 may involve quantizing the coefficients based on a step size, and the quantized coefficients are compressed in the entropy encoding step 607. Meanwhile, rate control module 606 interacts with quantization step 605 and entropy encoding step 607 to achieve a target bit rate. In particular, rate control 606 interacts with entropy encoding step 607 in order to control the bit rate during compression, such that more bits are used for pixels closer to the region of focus and fewer bits are used for pixels farther from the region of focus.

Specifically, with regard to quantization step 605, if the transform coefficients are floating point numbers (e.g., because the forward intra-component transform is a floating point transform), then different choices of granularity of step size effect lossy compression and can be used as a means to control bit rate. On the other hand, if the transform coefficients are integers (e.g., because the forward intra-component transform is an integer transform), then the step size is typically taken to be 1, and the quantization step may leave the data unchanged.

With regard to entropy encoding step 607, to increase coding flexibility, entropy encoding is typically performed individually on smaller blocks, or subdivisions of the transformed image of coefficients. These blocks may be variously called "code blocks" or "macroblocks" in different codecs. To further increase coding flexibility, a block may be further divided into layers so that entropy encoding is applied to each layer of a block. An example of division into layers is division according to bit plane. In other words, a layer consists of bits at the same significance (or same order), where the bits come from a binary representation of the quantized (integer) coefficients. Thus, entropy encoding step 607 comprises entropy encoding each layer of each block of quantized coefficients. Rate control 606 interacts with entropy encoding step 607 by determining which layer should be included in the coded output image, such that more bits are used for pixels closer to the region of focus and fewer bits are used for pixels farther from the region of focus.

The output of the encoding process is the coded output image 608.

The decoding path is basically the inverse of the encoding path. Briefly, during decoding, the coded output image 608 is input to entropy decoding step 609, and the result is output to dequantization step 610. The output of dequantization step 610 is output to inverse intra-component transform 611, and then to inverse inter-component transform 612. Postprocessing step 613 may, for example, involve shifting the values inversely of the way performed in preprocessing step 602. Finally, as a result of the decoding process, a reconstructed image 614 is output.

Figure 7:
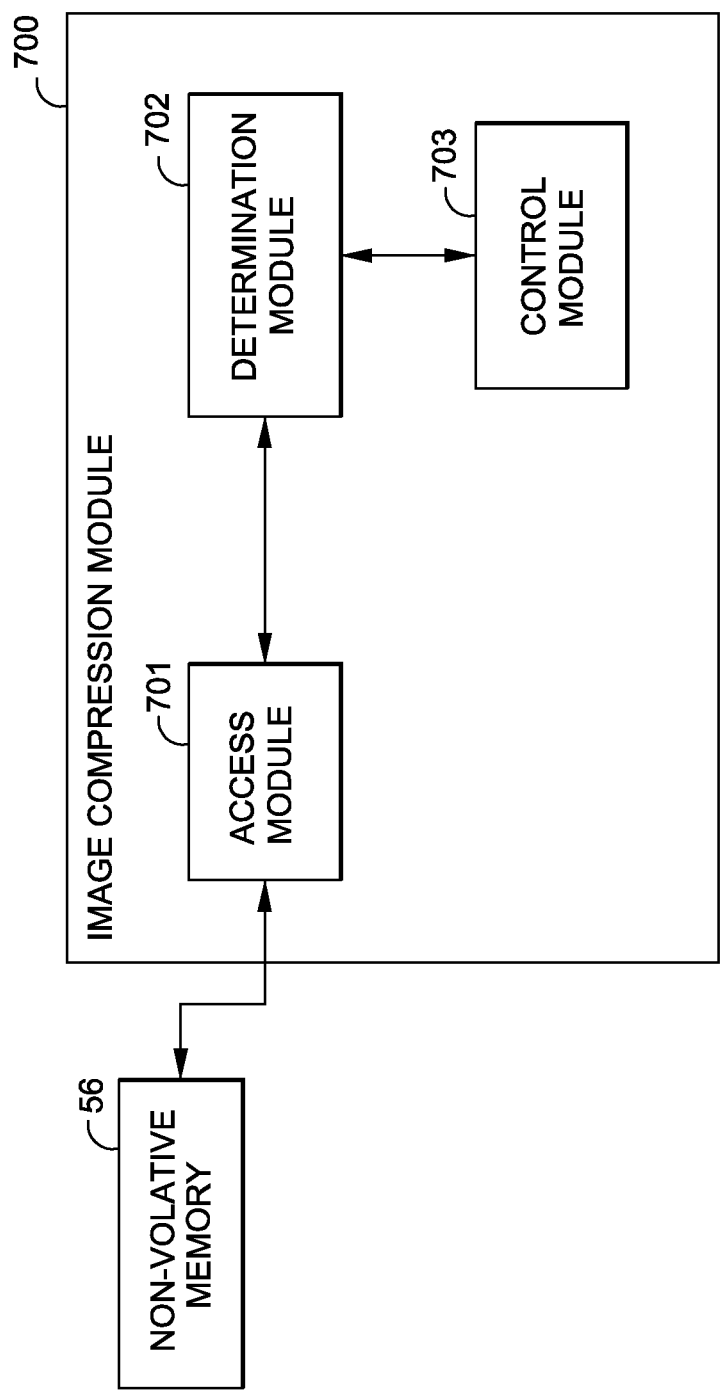
FIG. 7 is a view for explaining an image compression module according to an example embodiment.

FIG. 7 is a view for explaining an image compression module according to an example embodiment. In particular, FIG. 7 depicts an alternative embodiment to the hardware embodiment of compression/decompression unit 32. According to the embodiment of FIG. 7, image compression is performed by computer-executable process steps stored on a non-transitory computer-readable storage medium, such as non-volatile memory 56. More or fewer modules may be used, and other architectures are possible.

As shown in FIG. 7, image compression module 700 includes access module 701. Access module 701 is connected to non-volatile memory 56 in order to access image data and depth information for pixels of an image, such as image data 251 and depth map 252. Access module 701 is further connected to determination module 702. Determination module 702 determines a distance from a region of focus for pixels of the image by calculations that use the depth information (e.g., depth map 252) received from access module 701. Determination module 702 is further connected to control module 703, which controls a bit rate for compression of the image data in accordance with the distance from the region of focus, such that more bits are used for pixels closer to the region of focus and fewer bits are used for pixels farther from the region of focus. Each of these processes will be described more fully below.

Figure 8A:
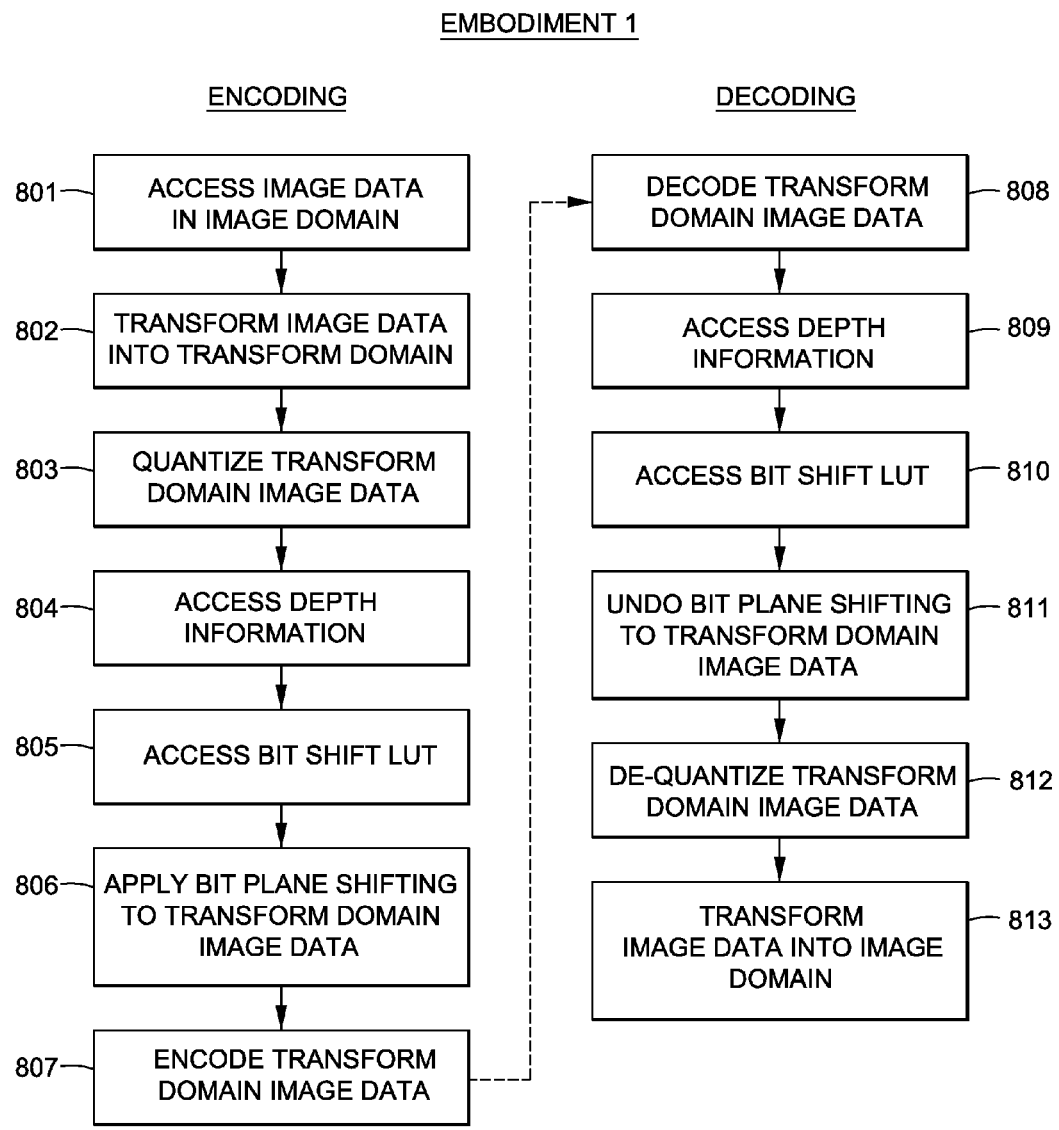
FIGS. 8A and 8B are flow diagrams for explaining processing in the image capture device shown in FIG. 1 according to example embodiments.
Figure 8B:
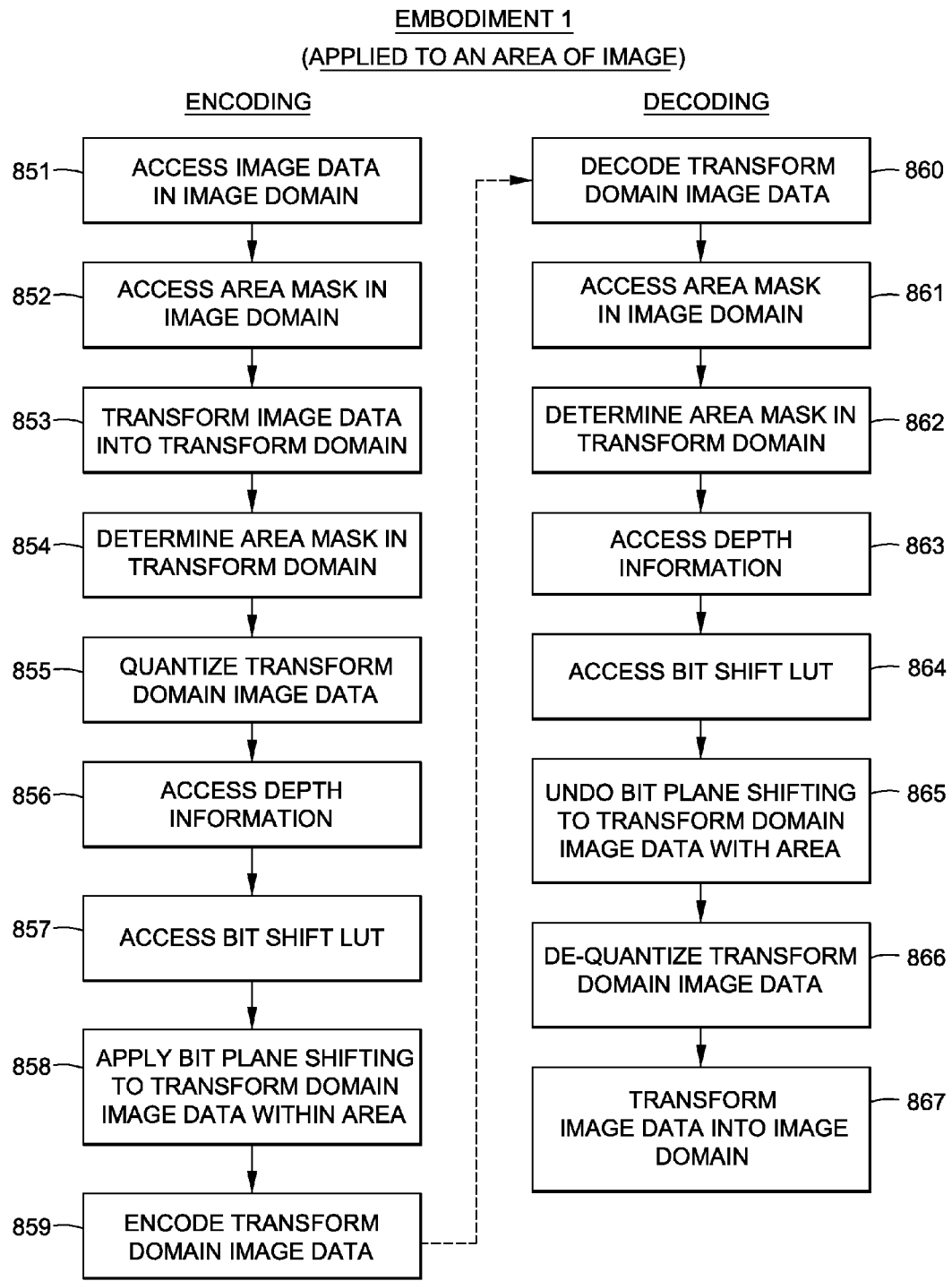

In particular, FIGS. 8A and 8B are flow diagrams for explaining processing in the image capture device shown in FIG. 1 according to example embodiments. Generally, the process follows the coding architecture depicted in FIG. 6. Rate control is effected by altering the significance of bits for a pixel relative to other pixels by bit plane shifting, such that the amount of bit plane shifting is dependent on the distance of the pixel from the region of focus. The altered quantized coefficients in the transform domain are then entropy encoded and the rate control 606 determines an optimal number of significance bit planes to be included in the coded output image in order to achieve a target bit rate.

Briefly, in FIG. 8A, compression of image data is provided. Image data is accessed, along with depth information for pixels of an image. A distance from a region of focus for pixels of the image is determined, by calculations that use the depth information. A bit rate for compression of the image data is controlled in accordance with the distance from the region of focus, such that more bits are used for pixels closer to the region of focus and fewer bits are used for pixels farther from the region of focus. More specifically, in one example, controlling the bit rate for compression includes determining a distance for a pixel in the transform domain based on distances of pixels in the image domain by applying an inverse transform to an impulse image with the impulse at the pixel in the transform domain, determining pixels in the inverse-transformed impulse image in the image domain that are non-zero, and assigning the distance for the pixel in the transform domain by choosing a smaller one of distances of determined non-zero pixels in the image domain from the region of focus.

Turning to FIG. 8A, in step 801, image data in the image domain is accessed.

In step 802, the image data in the image domain is transformed into the transform domain by, for example, the discrete wavelet transform (DWT). The data of the transform domain are coefficients, e.g., wavelet coefficients. Each pixel may have multiple components in the transform domain.

In step 803, the image data, i.e., coefficients, in the transform domain is quantized.

In the following example, the nominal dynamic range of the quantized coefficients is $[-2^B, 2^B-1]$, where B is the number of bits used in quantization. For example, B=8 corresponds to an 8-bit quantization of the magnitude of the coefficients (not including the sign, which requires another bit for encoding). Each pixel location in each channel of the image is then represented by an integer between $-2^B$ and $2^B-1$ inclusive.

The transformed image of quantized coefficients can be thought of as comprising bit planes. Thus, in an 8-bit example, the image can be thought of as eight binary images, with a 1 or a 0 at each pixel position. Bit plane compression, as described below, is compressing each of these planes. Typically, bit planes are compressed in the order of most significant bit plane to least significant bit plane, and the rate control module may determine to discard the lesser significant bit planes.

In step 804, depth information for the pixels is accessed. For example, the depth map 252 can be accessed from non-volatile memory 56. In this example, the tonal range of the depth map is $[-2^b, 2^b-1]$, where a depth of 0 corresponds to the plane of focus, and where b is an integer dependent on the tonal resolution of the depth map.

Thus, in step 805, a bit shift look-up table (LUT) s is accessed. More specifically, the bit shift LUT is a one-dimensional LUT that determines how the bit plane shifting is controlled by depth. The input to the bit shift LUT is a distance d from the region of focus. If the depth map has range $[-2^b, 2^b-1]$, then $0 \le d \le 2^{b+1}-1$. The output of the bit shift LUT is a number of shift bits. If the quantized coefficients have range $[-2^B, 2^B-1]$, then $0 \le s[d] \le B$ for any d.

Figure 9:
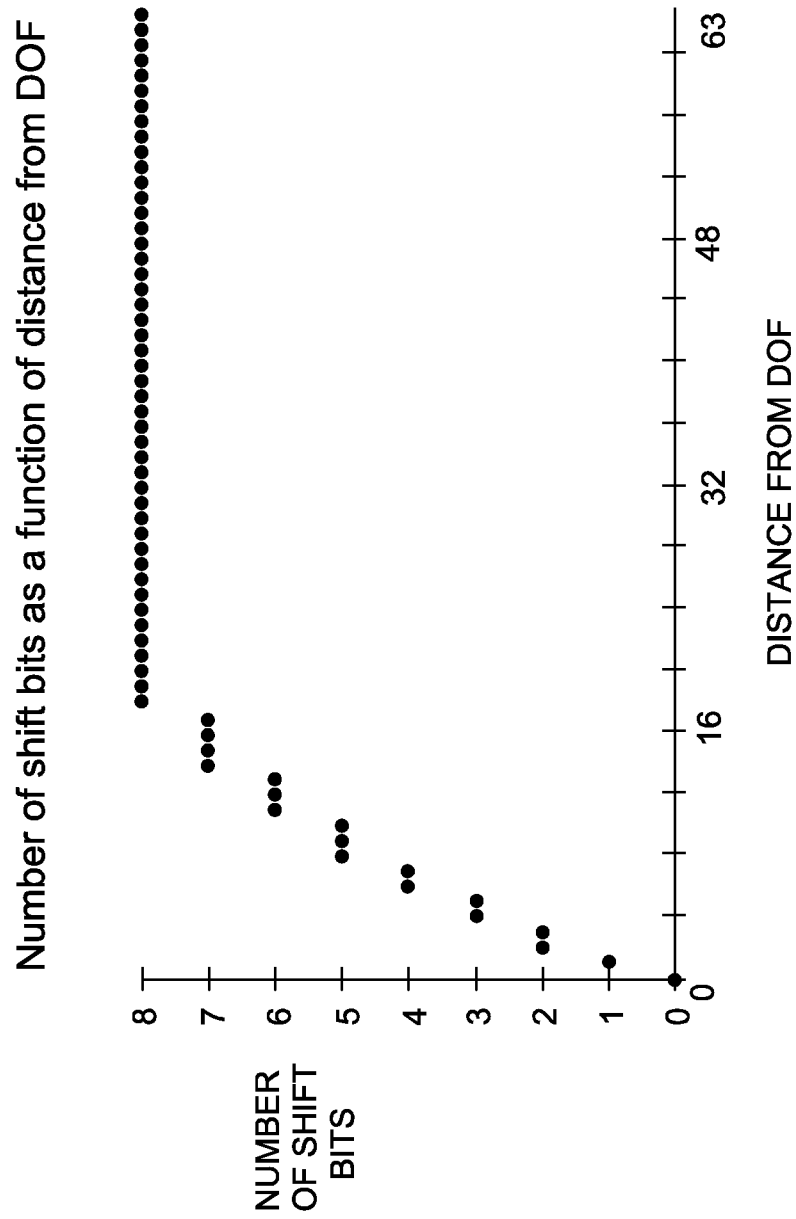
FIG. 9 is a view for explaining a look-up table according to an example embodiment.

FIG. 9 shows an example of such an LUT with B=8 and b=5. Specifically, FIG. 9 illustrates a relationship between a number of shift bits and a distance from depth of field. As shown, the number of shift bits increases as the distance from the depth of field increases. In particular, the number of shift bits is zero if the distance from the depth of field is zero. In other words, the significance of bits for a pixel relative to other pixels is altered by bit plane shifting, such that the significance of bits for a pixel outside the depth of field is decreased relative to pixels within the depth of field. In general, the LUT can be predetermined, either created manually or generated by some predetermined functional relationship.

Figure 10:
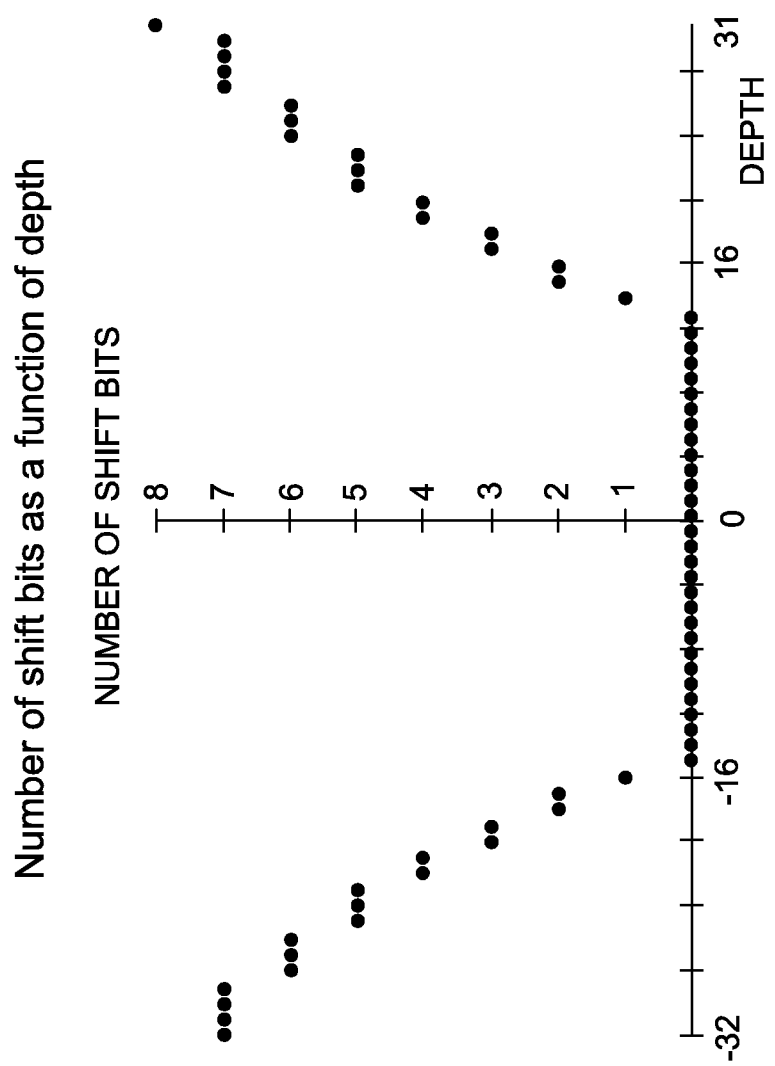
FIG. 10 is a view for explaining another look-up table according to an example embodiment.

FIG. 10 illustrates the process of applying the bit shift LUT in FIG. 9 to an example depth map. Specifically, with a given depth map, each pixel will have a depth value, and FIG. 10 shows an example of how the number of bit shifts can be deduced for the depth value of a pixel. In this example, the depth of field lies between depth value −15 and depth value 13. Based on the bit shift LUT in FIG. 9, it can be seen that the number of shift bits is zero between depth value −15 and depth value 13 inclusive. At depth value 14, for example, the distance from depth of field is 1. Based on the bit shift LUT in FIG. 9, it can be seen that the number of shift bits is 1 for depth value 14. The remaining of the graph in FIG. 10 can be deduced in a similar manner.

As explained above, the input to the bit shift LUT is a distance from a region of focus for pixels of the image, which is based on a depth map. However, a depth map is ordinarily defined in the image domain, not the transform domain. An embodiment that includes determining a distance for a pixel in the transform domain based on distances of pixels in the image domain is explained next. For that purpose, consider the inverse intra-component transform $T^{-1}$, shown as element 611 in FIG. 6. A distance for a pixel, say q, in the transform domain is assigned as follows. Consider an impulse image in the transform domain with the impulse at pixel q. In other words, an impulse image has value 0 at all pixels in the transform domain, except at pixel q, where it has value 1. The inverse transform $T^{-1}$ is applied to the impulse image to obtain the inverse-transformed impulse image in the image domain. Non-zero pixels, say $p_1, p_2, \ldots, p_n$, in the inverse-transformed impulse image are determined. These correspond to pixels in the image domain that q (a transform coefficient) contributes to in the reconstruction of image data in the image domain via the inverse transform.

Finally, the distance for pixel q in the transform domain is assigned by choosing a smaller one of distances of determined non-zero pixels $p_1, p_2, \ldots, p_n$ in the image domain from the region of focus. For example, $distDOF(q) = \min_{i=1, 2 \ldots n} distDOF(p_i)$, where $distDOF(q)$ denotes the distance from depth of field for pixel q in the transform domain, and $distDOF(p_i)$ denotes the distance from depth of field for pixel $p_i$ in the image domain. The number of shift bits can then be determined by looking up a LUT such as FIG. 9, for pixels in the transform domain, even though the depth map is not ordinarily defined in the transform domain.

Thus, a distance for a pixel in the transform domain is determined based on distances of pixels in the image domain. The above example uses a distance from depth of field. In other embodiments, another distance may be used, such as a distance from a plane of focus, or a distance from a region of focus.

In step 806, bit plane shifting is applied to the quantized coefficients in the transform domain, based on the distance of the pixel from the depth of field.

Figure 11:
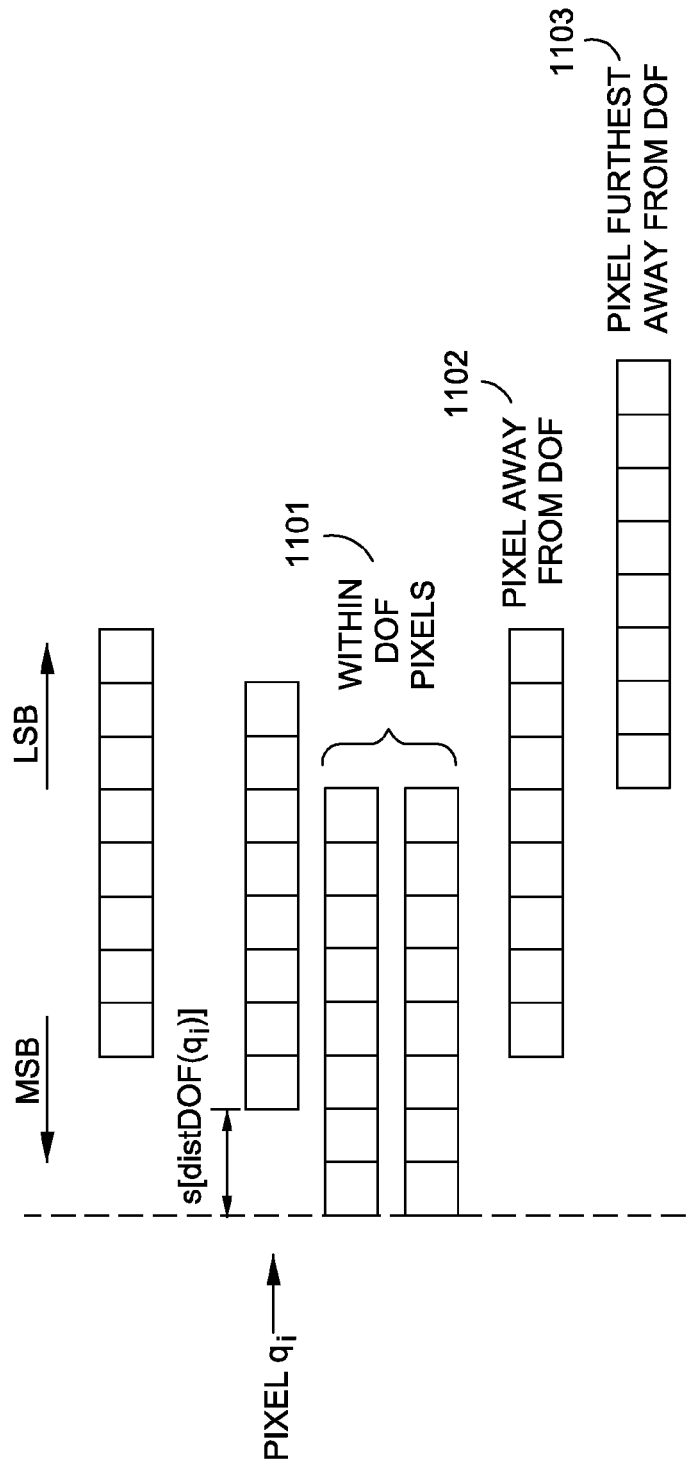
FIG. 11 is a view for explaining shifting of bit planes according to an example embodiment.

In that regard, FIG. 11 illustrates a result of bit plane shifting, where $s[distDOF(q_i)]$ refers to a number of shift bits for pixel $q_i$ from a bit shift LUT s such as the one shown in FIG. 9. In particular, in FIG. 11, the dotted line represents conceptually the transform domain and the distance perpendicular to the dotted line indicates the amount of bit shift for a pixel. Bit planes are shifted to lower significance for pixels that have a larger distance from the region of focus. As shown in FIG. 11, bit planes for pixels in the depth of field 1101 are not shifted at all, pixels further away from the depth of field 1102 are shifted somewhat towards the least significant bits, and pixels furthest away from the depth of field 1103 are shifted the most towards the least significant bits. When the transformed image data are compressed bit plane by bit plane in the order of most significant bit plane to least significant bit plane, due to the bit plane shifting, pixels outside the depth of field may not have bits in the most significant bit planes, resulting in compression of bits for pixels within the depth of field occurring prior to compression of bits for pixels outside the depth of field. In addition, if the rate control module decides to discard less significant bit planes by not compressing all the bit planes, then the compression may be less lossy for pixels within the depth of field than pixels outside the depth of field. Thus, more bits are used for pixels closer to the region of focus and fewer bits are used for pixels farther from the region of focus.

Accordingly, the image data are transformed into a transform domain, and the transformed image data are compressed bit plane by bit plane in the order of most significant bit plane to least significant bit plane. The significance of bits for a pixel relative to other pixels is altered by bit plane shifting, such that the amount of bit plane shifting is dependent on the distance of the pixel from the region of focus. Specifically, the bit plane shifting is performed according to the distance from the region of focus, such that more bits are used for pixels closer to the region of focus and fewer bits are used for pixels farther from the region of focus.

In step 807, encoding is performed on the image data in the transform domain. In this regard, once the shifting is performed in step 806, typical encoding proceeds, such as applying entropy encoding to each bit plane in each block of the transformed image, starting with the most significant bit plane and progressing to less significant bit planes, and with the possible outcome that the rate control module may decide to not encode all bit planes.

At this point, the output is an encoded and compressed image data ready for further processing or transmission.

As mentioned above, the decoding path is basically the inverse of the encoding path, and accordingly will not be described here in great detail. It should, however, be mentioned that decoding requires the same depth information used in encoding in order to undo the bit plane shifting applied during the encoding. Briefly, in step 808, the image data in the transform domain is decoded. In step 809, the depth information is accessed, and in step 810, the bit shift LUT is accessed. In step 811, the bit plane shifting to the image data in the transform domain is undone. In step 812, the image data in the transform domain is de-quantized. In step 813, the image data in the transform domain is inverse-transformed into image data in the image domain.

FIG. 8B is a flow diagram generally corresponding to the flow diagram of FIG. 8A, but explaining another example embodiment in which pixels of the image define an area of the image corresponding to an object in a scene, and in which depth based compression is applied only to the area of the image. When there are multiple areas of the image corresponding to multiple objects in a scene, a different compression, depth based or not, may be applied to each area. In addition, depth based compression may be applied to different areas with different bit shift LUTs in order to achieve a high level flexibility in rate control. Since most of the steps of FIG. 8B correspond to the steps of FIG. 8A, for purposes of conciseness only the steps introduced by FIG. 8B will be explained in detail below.

According to the embodiment of FIG. 8B, an object is defined by a binary mask, referred to as an area mask in the following. The area mask may be the outcome of an object segmentation algorithm. It may be based on discontinuity of intensity, such as from an RGB color image, discontinuity of depth, such as from a depth map, or other methods. It may be specified by the user or created through a user interface.

Specifically, after the image data in the image domain is accessed in step 851, an area mask in the image domain is accessed in step 852. The area mask is, for example, a binary mask M defining an area A in the image such that for a pixel p in the image domain, $M[p]=1$ if $p \in A$, and $M[p]=0$ if $p \notin A$. Thus, the mask defines an area of the image in the image domain corresponding to an object in the scene.

In step 854, the corresponding binary mask M' in the transform domain is defined by M'[q]=M[$p_1$]∨ M[$p_2$] ∨ ... ∨ M[$p_n$] for a pixel q in the transform domain, where ∨ is the logical OR operator. In more detail, consider the inverse intra-component transform $T^{-1}$, shown as element 611 in FIG. 6. Consider an impulse image in the transform domain with the impulse at pixel q. In other words, an impulse image has value 0 at all pixels in the transform domain, except at pixel q, where it has value 1. The inverse transform $T^{-1}$ is applied to the impulse image to obtain the inverse-transformed impulse image in the image domain. Non-zero pixels, say $p_1, p_2, \ldots, p_n$, in the inverse-transformed impulse image are determined. These correspond to pixels in the image domain that q (a transform coefficient) contributes to in the reconstruction of image data in the image domain via the inverse transform.

Figure 14:
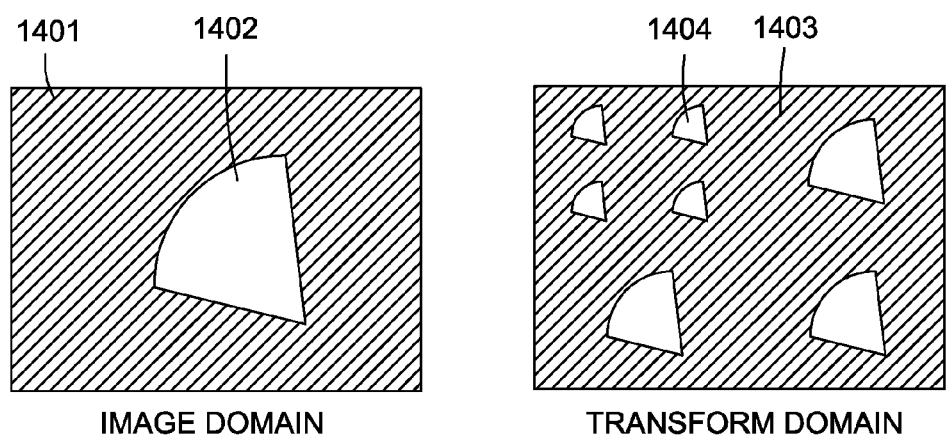
FIG. 14 is a view for explaining an area mask according to an example embodiment.

In that regard, FIG. 14 depicts an example of an area mask 1401 for area/object 1402 in an image domain and the corresponding mask 1403 in a transform domain.

Then, in step 858, bit plane shifting is applied only to pixels in the transform domain corresponding to an area defined by the transform domain area mask. In other words, bit plane shifting is applied only to a pixel q if M'[q]=1. Accordingly, depth based compression is applied only to the area of the image corresponding to an object in the scene.

During the decoding process, the area mask in the transform domain is required and is determined in steps 861 and 862 similar to steps 852 and 853 in the encoding process. In addition, during step 865, the bit plane shifting is undone only for pixels in the transform domain corresponding to an area defined by the transform domain area mask.

Thus, according to the embodiment of FIG. 8B, pixels of the image define an area of the image corresponding to an object in a scene, and depth based compression and decompression is performed only for the pixels of the area.

Figure 12:
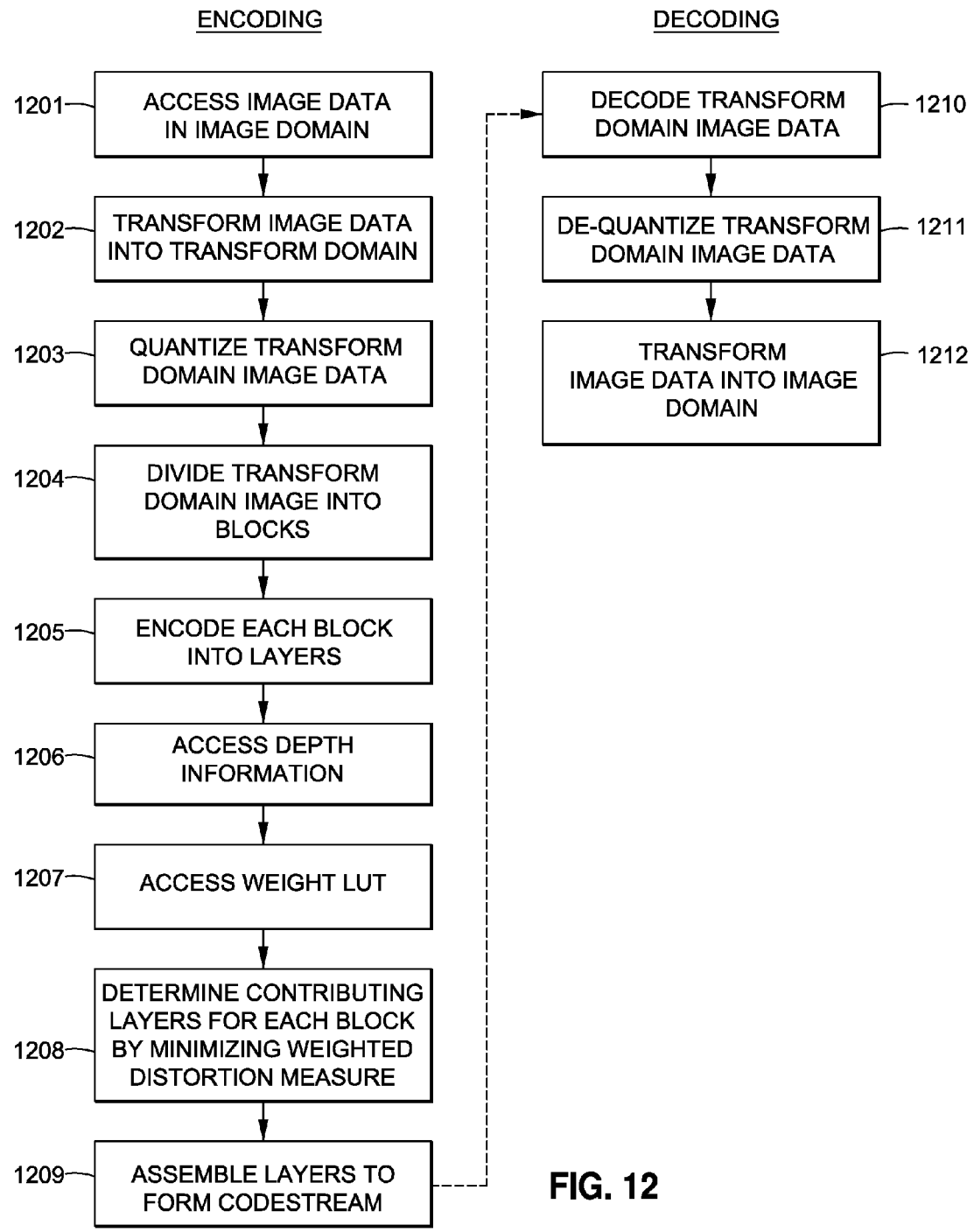
FIG. 12 is a flow diagram for explaining processing in the image capture device shown in FIG. 1 according to another example embodiment.
Figure 13:
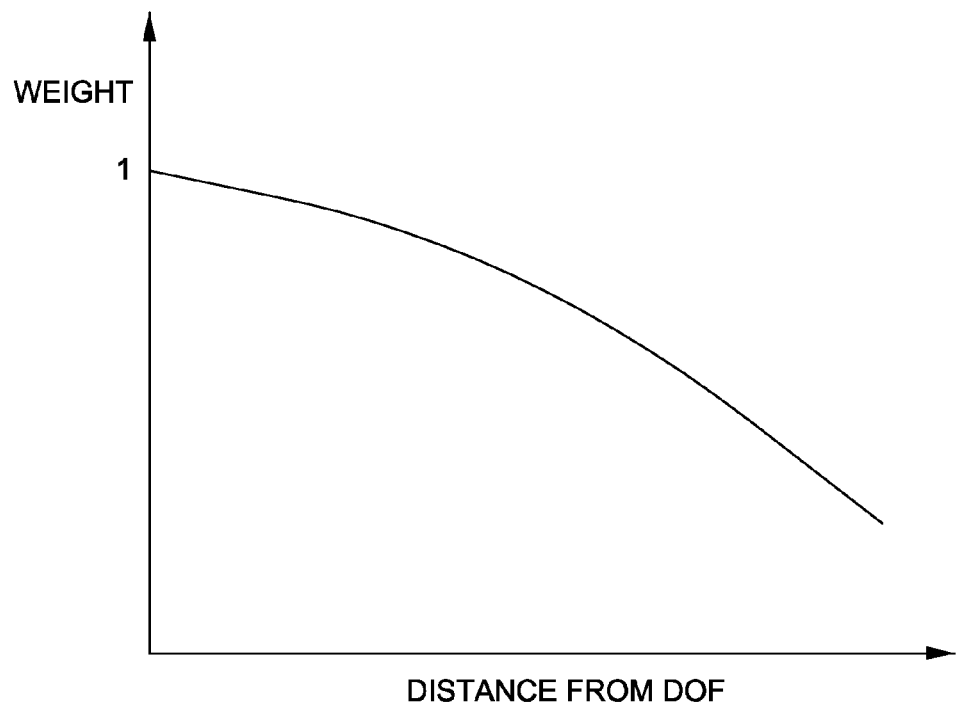
FIG. 13 is a view for explaining a relationship between a weight and a distance from depth of field according to an example embodiment.

FIG. 12 is a flow diagram for explaining processing in the image capture device shown in FIG. 1 according to still another example embodiment. In this embodiment, bit plane shifting is not used. Rather, a distance from a depth of field is defined for each block in the transformed image data in the transform domain, and is used to look up a weight from a weight LUT m, for example as shown in FIG. 13. The weight m[distDOF($B_i$)] for block $B_i$ determines the relative importance of the block, similar to the bit plane shift amount in previous embodiments.

Briefly, in FIG. 12, image data in the image domain is transformed into a transform domain, and the transformed image data is divided into blocks. Each block is coded into an initial code stream having layers of decreasing order of significance. A weight is determined for each block. The weight is dependent on a distance of the block from a region of focus. Contributing layers for each block are determined by minimizing a total sum of distortion measures for all blocks weighted by their respective weights, subject to a constraint that a total number of bits from the contributing layers of all blocks does not exceed a predesignated bit budget. A final code stream is assembled by including determined contributing layers from each block.

In more detail, in step 1201, image data in the image domain is accessed. In step 1202, the image data in the image domain is transformed into image data in the transform domain, and in step 1203, the image data in the transform domain is quantized. In this regard, these steps may be identical or similar to steps 801 to 803 as described above.

In step 1204, the image data in the transform domain is divided into blocks. More specifically, the transformed image in the transform domain is subdivided into K small blocks $B_i$ where i=1, 2, ..., K. These blocks may be variously called "code blocks" or "macroblocks" in different codecs. Dividing the transformed image into multiple blocks allows a high level of flexibility in rate control by controlling the contribution of each block in the final code stream.

In step 1205, each of the blocks is encoded into layers of decreasing order of significance. In an example embodiment, each layer of a block is the output of entropy encoding a bit plane of the block. Thus, the layer of highest significance corresponds to the output of entropy encoding the most significant bit plane, and the layer of lowest significance corresponds to the output of entropy encoding the least significant bit plane. For purposes of this example, each block $B_i$ is encoded into a code stream with a number of layers $L_i$ in descending order of significance, and the size of the jth layer is $r_{ij}$ bits.

In step 1206, depth information is accessed. The depth information is used to define a distance from the depth of field value for a block $B_i$, as distDOF($B_i$)=min {distDOF (q)|q∈$B_i$}, where distDOF(q) can be defined as described above with respect to step 805.

In step 1207, a weight LUT is accessed, an example of which is shown in FIG. 13. The distDOF value for each block is used to look up a weight from the weight LUT. The weight m[distDOF($B_i$)] for block $B_i$ determines the relative importance of the block, similar to the bit plane shift amount described above with respect to FIG. 8A. Thus, a weight for each block is determined, wherein the weight is dependent on a distance of the block from the region of focus.

In step 1208, contributing layers for each block are determined, by minimizing a total sum of distortion measures for all blocks weighted by their respective weights, subject to a constraint that a total number of bits from the contributing layers of all blocks does not exceed a predesignated bit budget. In one example embodiment, the distortion measure for each block is taken to be $$\frac{L_i - n_i}{L_i},$$

where $L_i$ is the number of layers for block $B_i$, and $n_i$ is the number of layers to be included in the final code stream. Then determining the contributing layers for each block is equivalent to determining the optimal $n_i$, $n_i \leq L_i$, for all i=1, 2, ..., K. This can be accomplished by minimizing the weighted distortion measure $$\sum_{i=1}^{K} m[distDOF(B_i)] \cdot \frac{L_i - n_i}{L_i},$$

subject to the constraint $\Sigma_{i=1}^{K}\Sigma_{j=1}^{n_i} r_{ij} \leq R$, where R is a predesignated bit budget (in number of bits).

As another variation which can be used for multiple images (e.g., a movie), for a target average bit rate of M bits/sec, a group of F images (frames) may be encoded at a time, and the encoding problem is one of finding optimal $n_i^{(f)}$, $n_i^{(f)} \leq L_i^{(f)}$, i=1, 2, ..., $K^{(f)}$, by minimizing $$\sum_{f=1}^{F} \sum_{i=1}^{K^{(f)}} m[distDOF(B_i^{(f)})] \cdot \frac{L_i^{(f)} - n_i^{(f)}}{L_i^{(f)}},$$

subject to the constraint $\sum_{f=1}^{F}\sum_{F=1}^{K^{(f)}}\sum_{j=1}^{n_i^{(f)}} r_{ij}^{(f)} \leq M \cdot F/P$, where P is the frame rate (in frames per second) and superscript (f) on each symbol refers to the fth image (frame).

In step 1209, the determined contributing layers from each block are assembled to form a final code stream.

In the decoding process, in step 1210, the image data in the transform domain is decoded. In step 1211, the image data in the transform domain is de-quantized, and in step 1212, the image data in the transform domain is inverse-transformed into image data in the image domain. In comparison with the previous embodiments involving bit plane shifting, the decoding process of this embodiment does not require the depth information or the bit shift LUT.

By controlling the bit rate of a compression process based on a depth map which allows determination of the distance of each pixel in the image from a region of focus, it is ordinarily possible to compress different areas of the image according to a more optimal bit allocation, thereby improving the visual quality of the compressed image for a given target bit rate.

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. A data compression method comprising:
   accessing image data and depth information for pixels of an image;
   determining a distance from a region of focus for pixels of the image by calculations that use the depth information;
   controlling a bit rate for compression of the image data in accordance with the distance from the region of focus, such that more bits are used for pixels closer to the region of focus and fewer bits are used for pixels farther from the region of focus;
   wherein compression includes the steps of transforming the image data from an image domain into coefficients in a transform domain, quantizing the coefficients, and entropy-encoding the quantized coefficients, and wherein controlling the bit rate for compression comprises determining a distance for a pixel in the transform domain based on distances of pixels in the image domain, and
   wherein determining a distance for a pixel in the transform domain based on distances of pixels in the image domain comprises the steps of:
   applying an inverse transform to an impulse image with the impulse at the pixel in the transform domain;
   determining pixels in the inverse-transformed impulse image in the image domain that are non-zero; and
   assigning the distance for the pixel in the transform domain by choosing a smaller one of distances of determined non-zero pixels in the image domain from the region of focus.

2. The data compression method according to claim 1, further comprising:
   transforming the image data into a transform domain;
   dividing the transformed image data into blocks;
   coding each block into an initial code stream having layers of decreasing order of significance;

determining a weight for each block, wherein the weight is dependent on a distance of the block from the region of focus;

determining contributing layers for each block by minimizing a total sum of distortion measures for all blocks weighted by their respective weights, subject to a constraint that a total number of bits from the contributing layers of all blocks does not exceed a predesignated bit budget; and assembling a final code stream by including determined contributing layers from each block.

3. A data compression method comprising:

accessing image data and depth information for pixels of an image;

determining a distance from a region of focus for pixels of the image by calculations that use the depth information; and controlling a bit rate for compression of the image data in accordance with the distance from the region of focus, such that more bits are used for pixels closer to the region of focus and fewer bits are used for pixels farther from the region of focus, wherein the image data are transformed into a transform domain, and the transformed image data are compressed bit plane by bit plane in the order of most significant bit plane to least significant bit plane, wherein the significance of bits for a pixel relative to other pixels is altered by bit plane shifting, such that the amount of bit plane shifting is dependent on the distance of the pixel from the region of focus.

4. The data compression method according to claim 3, wherein the region of focus corresponds to a depth of field.

5. The data compression method according to claim 3, wherein the region of focus corresponds to a plane of focus.

6. The data compression method according to claim 3, wherein the depth information indicates distances of pixels from a reference point of view, wherein the region of focus is calculated using capture parameters, and wherein the distance of a pixel from the region of focus is calculated by comparing the distance of the pixel and the distance of the region of focus from the reference point of view.

7. The data compression method according to claim 3, wherein pixels of the image define an area of the image corresponding to an object in a scene.

8. A data compression apparatus, comprising:

a computer-readable memory constructed to store computer-executable process steps;

a processor constructed to execute the computer-executable process steps stored in the memory;

wherein the process steps stored in the memory cause the processor to:

access image data and depth information for pixels of an image;

determine a distance from a region of focus for pixels of the image by calculations that use the depth information;

control a bit rate for compression of the image data in accordance with the distance from the region of focus, such that more bits are used for pixels closer to the region of focus and fewer bits are used for pixels farther from the region of focus;

wherein compression includes the steps of transforming the image data from an image domain into coefficients in a transform domain, quantizing the coefficients, and entropy-encoding the quantized coefficients, and wherein controlling the bit rate for compression comprises determining a distance for a pixel in the transform domain based on distances of pixels in the image domain, and wherein determining a distance for a pixel in the transform domain based on distances of pixels in the image domain comprises the steps of:

applying an inverse transform to an impulse image with the impulse at the pixel in the transform domain;

determining pixels in the inverse-transformed impulse image in the image domain that are non-zero; and assigning the distance for the pixel in the transform domain by choosing a smaller one of distances of determined non-zero pixels in the image domain from the region of focus.

9. The apparatus according to claim 8, wherein the process steps stored in the memory further cause the processor to:

transform the image data into a transform domain;

divide the transformed image data into blocks;

code each block into an initial code stream having layers of decreasing order of significance;

determine a weight for each block, wherein the weight is dependent on a distance of the block from the region of focus;

determine contributing layers for each block by minimizing a total sum of distortion measures for all blocks weighted by their respective weights, subject to a constraint that a total number of bits from the contributing layers of all blocks does not exceed a predesignated bit budget; and assemble a final code stream by including determined contributing layers from each block.

10. A data compression apparatus, comprising:

a computer-readable memory constructed to store computer-executable process steps;

a processor constructed to execute the computer-executable process steps stored in the memory;

wherein the process steps stored in the memory cause the processor to:

access image data and depth information for pixels of an image;

determine a distance from a region of focus for pixels of the image by calculations that use the depth information; and control a bit rate for compression of the image data in accordance with the distance from the region of focus, such that more bits are used for pixels closer to the region of focus and fewer bits are used for pixels farther from the region of focus, wherein the image data are transformed into a transform domain, and the transformed image data are compressed bit plane by bit plane in the order of most significant bit plane to least significant bit plane, wherein the significance of bits for a pixel relative to other pixels is altered by bit plane shifting, such that the amount of bit plane shifting is dependent on the distance of the pixel from the region of focus.

11. The apparatus according to claim 10, wherein the region of focus corresponds to a depth of field.

12. The apparatus according to claim 10, wherein the region of focus corresponds to a plane of focus.

13. The apparatus according to claim 10, wherein the depth information indicates distances of pixels from a reference point of view, wherein the region of focus is calculated using capture parameters, and wherein the distance of a pixel from the region of focus is calculated by comparing the distance of the pixel and the distance of the region of focus from the reference point of view.

14. The apparatus according to claim 10, wherein pixels of the image define an area of the image corresponding to an object in a scene.

15. A non-transitory computer-readable storage medium on which is stored computer-executable process steps for causing a computer to compress data, said process steps comprising:

accessing image data and depth information for pixels of an image;

determining a distance from a region of focus for pixels of the image by calculations that use the depth information; and controlling a bit rate for compression of the image data in accordance with the distance from the region of focus, such that more bits are used for pixels closer to the region of focus and fewer bits are used for pixels farther from the region of focus, wherein compression includes the steps of transforming the image data from an image domain into coefficients in a transform domain, quantizing the coefficients, and entropy-encoding the quantized coefficients, and wherein controlling the bit rate for compression comprises determining a distance for a pixel in the transform domain based on distances of pixels in the image domain, and wherein determining a distance for a pixel in the transform domain based on distances of pixels in the image domain comprises the steps of:

applying an inverse transform to an impulse image with the impulse at the pixel in the transform domain;

determining pixels in the inverse-transformed impulse image in the image domain that are non-zero; and assigning the distance for the pixel in the transform domain by choosing a smaller one of distances of determined non-zero pixels in the image domain from the region of focus.

16. A non-transitory computer-readable storage medium on which is stored computer-executable process steps for causing a computer to compress data, said process steps comprising:

accessing image data and depth information for pixels of an image;

determining a distance from a region of focus for pixels of the image by calculations that use the depth information; and controlling a bit rate for compression of the image data in accordance with the distance from the region of focus, such that more bits are used for pixels closer to the region of focus and fewer bits are used for pixels farther from the region of focus, wherein the image data are transformed into a transform domain, and the transformed image data are compressed bit plane by bit plane in the order of most significant bit plane to least significant plane, wherein the significance of bits for a pixel relative to other pixels is altered by bit plane shifting, such that the amount of bit plane shifting is dependent on the distance of the pixel from the region of focus.

17. The non-transitory computer-readable storage medium according to claim 16, wherein the depth information indicates distances of pixels from a reference point of view, wherein the region of focus is calculated using capture parameters, and wherein the distance of a pixel from the region of focus is calculated by comparing the distance of the pixel and the distance of the region of focus from the reference point of view.

* * * * *